(12) United States Patent
Dettinger et al.

(10) Patent No.: US 7,493,309 B2
(45) Date of Patent: Feb. 17, 2009

(54) FRAMEWORK FOR DYNAMIC ANALYSIS OF VARYING STRUCTURED DATA USING MULTIPLE ANALYSIS TECHNIQUES

(75) Inventors: Richard D. Dettinger, Rochester, MN (US); Michael P. Koranda, Rochester, MN (US); Richard J. Stevens, Mantorville, MN (US); Erik E. Voldal, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1074 days.

(21) Appl. No.: 10/345,918

(22) Filed: Jan. 16, 2003

(65) Prior Publication Data

US 2004/0143567 A1 Jul. 22, 2004

(51) Int. Cl.
*G06F 7/00* (2006.01)
*G01M 19/00* (2006.01)

(52) U.S. Cl. .................. 707/3; 707/102; 707/104.1; 702/122

(58) Field of Classification Search ............... 707/1–10, 707/100–102, 104.1, 200–201; 705/2, 3; 709/203; 715/503; 702/122
See application file for complete search history.

(56) References Cited

U.S. PATENT DOCUMENTS

| | | | |
|---|---|---|---|
| 5,961,448 A * | 10/1999 | Swenson et al. ............ 600/301 |
| 6,014,661 A * | 1/2000 | Ahlberg et al. .................. 707/3 |
| 6,056,428 A * | 5/2000 | Devoino et al. ................ 703/2 |
| 6,134,564 A * | 10/2000 | Listou ........................ 715/505 |
| 6,157,900 A * | 12/2000 | Maseeh .......................... 703/2 |
| 6,202,043 B1 * | 3/2001 | Devoino et al. ................ 703/17 |
| 6,374,369 B1 * | 4/2002 | O'Donnell .................... 714/38 |
| 6,385,301 B1 * | 5/2002 | Nolting et al. ........... 379/32.01 |
| 6,405,195 B1 * | 6/2002 | Ahlberg ........................ 707/4 |
| 6,549,869 B1 * | 4/2003 | Piety et al. .................. 702/122 |
| 6,736,776 B2 * | 5/2004 | Miles .......................... 600/300 |
| 7,000,227 B1 * | 2/2006 | Henry ........................ 717/152 |
| 7,063,644 B2 * | 6/2006 | Albert et al. ..................... 482/8 |
| 7,086,014 B1 * | 8/2006 | Bartz et al. .................... 716/1 |
| 2002/0066079 A1 * | 5/2002 | Ionescu ...................... 717/127 |
| 2004/0049300 A1 * | 3/2004 | Thiele et al. .................. 700/29 |
| 2004/0088306 A1 * | 5/2004 | Murthy et al. .............. 707/100 |
| 2004/0229729 A1 * | 11/2004 | Albert et al. .................... 482/8 |

* cited by examiner

*Primary Examiner*—Miranda Le
(74) *Attorney, Agent, or Firm*—Patterson & Sheridan, LLP (57) ABSTRACT

The present invention provides for methods directed to dynamically generating input to an analysis environment. Varying input data is linked with analysis routines by provision of a well defined but general purpose input structure for selected data, which is used as input to analysis routines. Metadata is used to describe the multiple analysis routines and their capabilities, and a framework both automatically formats the input data and customizes the analysis routine to accept the specific dynamic fields available in the input. In this manner, data (e.g., a query) containing new input fields is dynamically made available to multiple existing analysis techniques.

8 Claims, 5 Drawing Sheets

REPORT SECTION

COMPARE OF GENE INFO VS CALCIUM LEVELS

| Variable | | Valve_Type | | All |
|---|---|---|---|---|
| | | Normal | Rheumatic | |
| Normalized_Intensity | N | 8 | 6 | 14 |
| | Mean | 1.81 | 2.46 | 2.09 |
| | Str | 2.27 | 2.83 | 2.44 |
| | Median | 1.00 | 1.15 | 1.01 |
| | Min | 0.24 | 0.32 | 0.24 |
| | Max | 7.24 | 7.45 | 7.45 |
| Hist with_Ca_Real_Mean | N | 6 | 6 | 12 |
| | Mean | 1.34 | 1.32 | 1.33 |
| | Str | 0.09 | 0.12 | 0.10 |
| | Median | 1.29 | 1.30 | 1.34 |
| | Min | 1.28 | 1.17 | 1.17 |
| | Max | 1.46 | 1.40 | 1.46 |

Fig. 5

FRAMEWORK FOR DYNAMIC ANALYSIS OF VARYING STRUCTURED DATA USING MULTIPLE ANALYSIS TECHNIQUES

BACKGROUND OF THE INVENTION

1. Field of the Invention

The present invention generally relates to data processing, and more particularly to analysis of query results.

2. Description of the Related Art

As the information accessible to IT solutions becomes more distributed and diversified, it will become increasingly necessary to access information from multiple data sources and integrate the information retrieved into a representation which meets the needs of the application and end users of the application. This information not only needs to be displayed for a user to view or update, but may require advanced analysis techniques to develop knowledge and insights from the data.

Currently, a variety of methods, techniques and products are available to perform these types of analyses. Unfortunately, these conventional solutions require that the data be in specific formats (e.g., specified by Comma Separated Variables, SQL selection from database table, text files, XML representations, etc.) prior to executing their respective analysis algorithms, and in most cases require some knowledge of what the specific fields in the data sources contain (e.g., maximum lengths of character data).

The problem is further complicated by the fact that the input data (i.e., the data input to the analysis algorithms) is typically a subset of the entire data available from the data sources. The user attempting to gain insight from the data frequently cannot predict which combinations of data will be fed into which analysis algorithms. As a result, custom programming is needed to link specific input data retrieved from the data sources into a format suitable for the analysis algorithms and custom programming in the analysis application to accept this specific data. Accordingly, for each query, the fields returned from that query need to be known in advance by the analysis routine. This means that for every query specified by a user, and for every analysis needed, a custom program configured to accept those inputs returned by those specific queries must be written. Therefore, a new query specified by a user and containing different or additional fields, requires a new analysis program. Further, if this same data were to be analyzed by multiple algorithms, each of these new algorithms would need to be developed. These custom analysis algorithms are tied to a specific set of input data and are not available for use with new queries containing different fields.

Therefore, there is a need for a mechanism for dynamically generating input to an analysis environment.

SUMMARY OF THE INVENTION

The present invention generally provides methods directed to dynamically generating input to an analysis environment.

In one embodiment, a user selection is received of an analysis routine configured to perform an analysis on selected data in an analysis environment. The user-selected analysis routine has a predefined association with a code portion configured to provide the input to the analysis environment. In response to the user selected analysis routine, parameter values are displayed in one or more fields; wherein the one or more fields are predefined for the user selected analysis routine and wherein the parameter values are made available from the selected data. A user selection of one or more of the parameter values is then received. Based on the user selections, the code portion generates information necessary to perform the analysis on the selected data. Subsequently, the code portion outputs the input to the analysis environment; wherein the input includes at least the selected data and the information necessary to perform the analysis on the selected data.

Another embodiment provides a method of dynamically generating input for an analysis environment to perform data analysis on selected data, in which an analysis routine selection screen containing a plurality of analysis routines for user selection is displayed. Based on a user-selected analysis routine, a plurality of parameter values are then displayed. The input is generated using the selected data, the user-selected analysis routine and one or more user-selected parameter values, and then provided to the analysis environment.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention provides for methods, apparatus and articles of manufacture directed to dynamically generating input to an analysis environment. Varying input data is linked with analysis routines by provision of a well defined but general purpose input structure for selected data, which is used as input to analysis routines. Metadata is used to describe the multiple analysis routines and their capabilities, and a framework both automatically formats the input data and customizes the analysis routine to accept the specific dynamic fields available in the input. In this manner, data (e.g., a query) containing new input fields is dynamically made available to multiple existing analysis techniques.

Aspects of the invention achieve particular advantage in the area of medical services (e.g., managing patient records). Accordingly, embodiments will be described in this context. However, the invention is more generally applicable to any data, regardless of type or content and, therefore, not limited to the particular applications described herein, which are provided by way of illustration only.

One embodiment of the invention is implemented as a program product for use with a computer system such as, for example, the environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
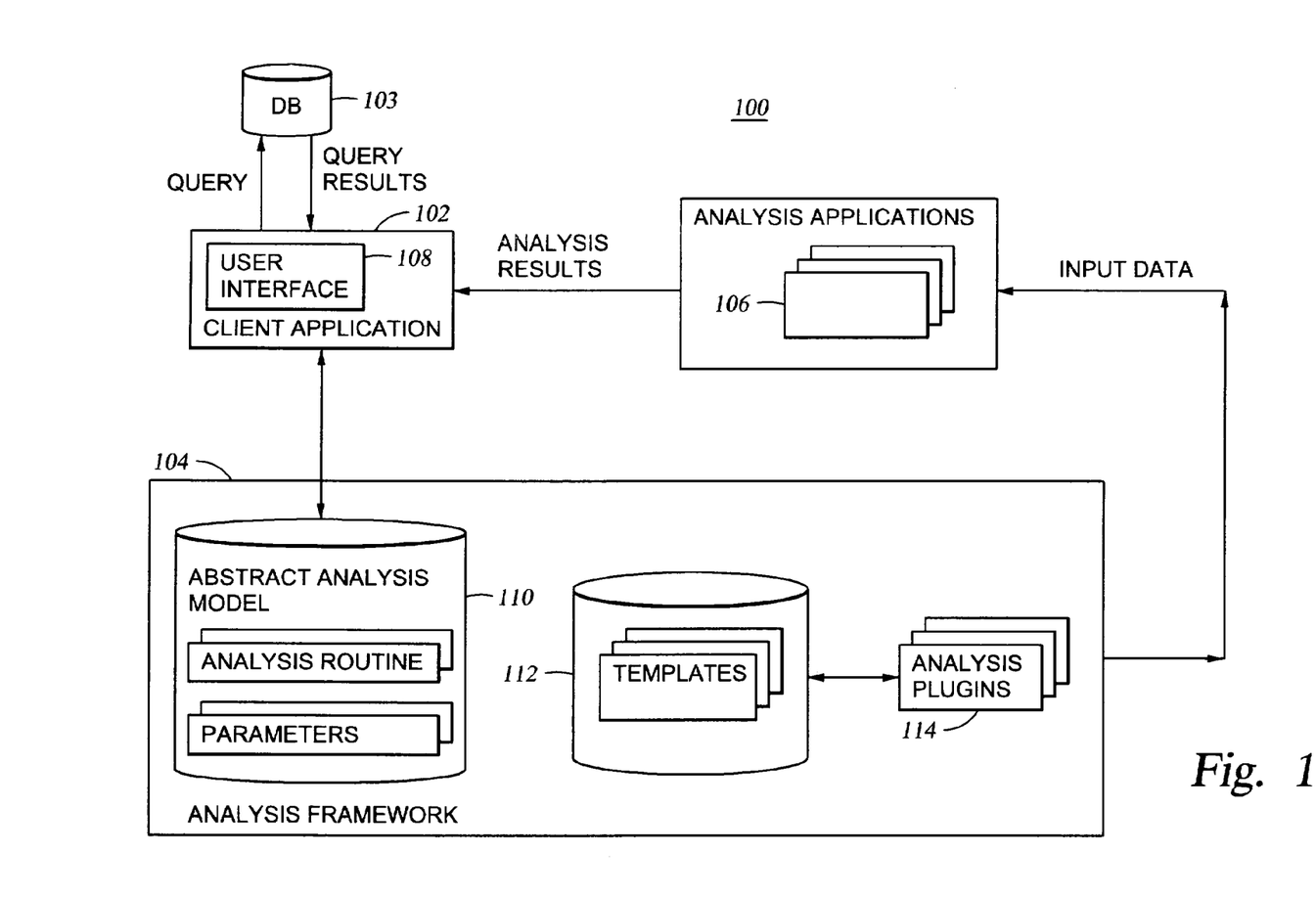
FIG. 1 is a block diagram of the representative computer environment configured to dynamically generate input to a processing environment.

FIG. 1 is a logical view of an environment 100 incorporating aspects of the invention. In general, the environment 100 includes a client application 102, a database 103 against which queries are issued, an analysis framework 104 and a plurality of analysis applications 106. The components of the environment 100 may be resident on a common system or be components of a distributed system connected via a local area network (LAN) or wide area network (WAN) capable of supporting the appropriate information exchange according to embodiments provided herein. In a particular embodiment, the components of the environment 100 communicate via the Internet.

The client application 102 is shown as being configured with, or having access to, a user interface 108. Preferably, the user interface 108 is a graphical user interface. In a particular embodiment, the user interface 108 is a network browser (e.g., a Web browser) allowing for navigation of network addresses. The client application 102 and the user interface 108 may allow users to formulate and issue queries for execution against one or more databases 103. In addition, the client application 102 and the user interface 108 facilitate customization of input subsequently provided to the analysis applications 106 for analysis. The input generally includes some data to be analyzed, as well as analysis instructions (e.g., executable code or control information) needed to perform the analysis. The data to be analyzed may originate from any of a variety of sources such as, for example, the database 103. In one embodiment, the data to be analyzed are query results. The analysis instructions needed to perform the analysis are provided by the analysis framework 104, and the particular nature of the analysis instructions depends upon the analysis to be performed by the analysis applications 106.

Customization of the data to be analyzed and the analysis instructions may be performed through a series of user selections made via screens of the user interface 108. In one embodiment, the user interface screens are populated with information from the analysis framework 104. Specifically, the analysis framework 104 includes an abstract analysis model 110 containing information used to populate the user interface screens with a plurality of analysis routines selections, and subsequently with parameter selections needed for the selected analysis routine. The user-selected parameters and the data to be analyzed are then provided to an appropriate plug-in 114 specified by the abstract analysis model 110 according to the user-selected analysis routine. The plug-ins 114 take and format the user-selected parameters and the data to be analyzed, and then provide the results of its operations to the analysis applications 106. In some cases, the plug-ins 114 populate templates 112 with the user-selected parameters and the data to be analyzed. The populated templates are then the input provided to an analysis application 106. In any case, the appropriate analysis application 106 then runs the selected analysis routine and returns any results to the user interface 108 for display to the user.

Figure 2:
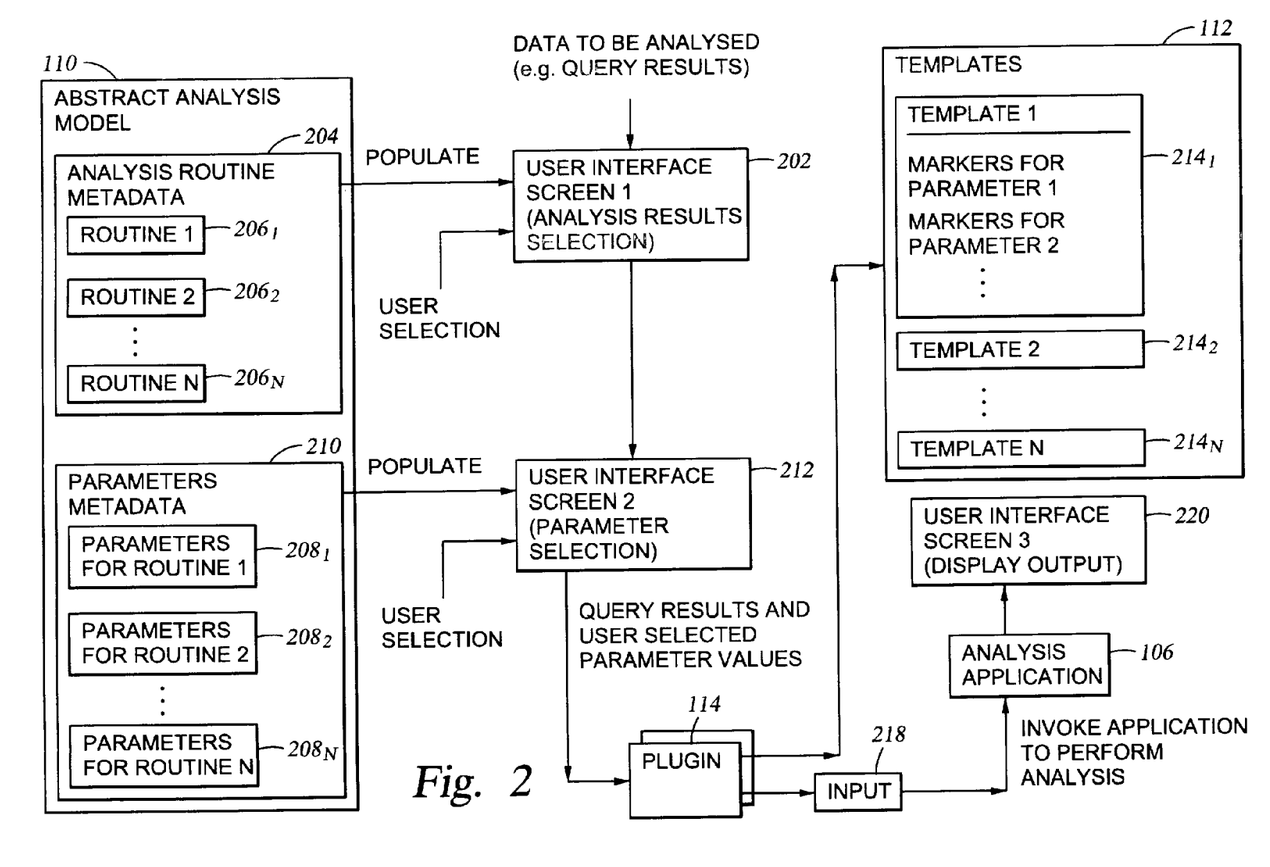
FIG. 2 is a block diagram of a representative computer environment illustrating data flow and control flow for the dynamic generation of input to a processing environment.

FIG. 2 is a more detailed representation of one embodiment of the invention. It is assumed that a user desires some data to be analyzed by an analysis application 106. By way of illustration, and not limitation, it is assumed that the data to be analyzed are query results. Thus, a query has been executed and results returned. The results may be displayed in a user interface screen 202 of the user interface 108. In one embodiment, preparation for analysis is initiated by user selection of an analysis routine from, e.g., an analysis routine selection menu of the user interface screen 202 (as will be described in more detail below with respect to FIG. 3). The user interface screen 202 is populated with the analysis routine selections the Abstract Analysis Model 110. To this end, the Abstract Analysis Model 110 includes an analysis routine selections definition portion 204 (also referred to herein as analysis routine metadata 204) defining a plurality of analysis routine selections $206_1, 206_2 \ldots 206_N$ (collectively, analysis routine selections 206, or simply selections 206). In a particular embodiment, the selections 206 of the Abstract Analysis Model 110 include references to the various plug-ins 114. Accordingly, a plug-in 114 is provided for each analysis routine selection 206, and selection of a particular analysis routine selection 206 from the screen 202 necessarily results in the selection of a plug-in 114. However, it is noted that a single plug-in may be associated with more than one analysis routine selection 206. Thus, the total number of plug-ins may be less than the total number of analysis routine selection 206.

Further, each plug-in 114 is defined to accept predefined parameters (or more particularly, parameter values). Accordingly, the abstract analysis model 110 includes a parameter definitions portion 210 (also referred to herein as the parameter metadata 210) which includes parameter definitions sets $208_1, 208_2 \ldots 208_N$ (collectively, parameter definition set(s) 208), where each parameter definition set 208 is specific to a particular routine selection 206. The parameter metadata 210 does not contain parameter values themselves, but rather defines an interface for receiving the parameter values. At least in part, the parameter values are user selected from a user interface screen 212 populated by the data to be analyzed (e.g., the query results) and, in some cases, from hidden fields specified in the parameter definition sets 208. Thus, those parameter values made available to the user for selection from the screen 212, are directly dependent on the data to be analyzed (e.g., the query results).

In one embodiment, one or more of the user-selected parameter values (which may include any default values the user did not change) are used to populate one of a plurality of templates $214_1, 214_2 \ldots 214_N$ (collectively, template(s) 214). Whether a template 214 is needed is determined by the analysis application 106 to be run. A template allows for ease in building the analysis instructions where the majority of the instructions are fixed, but a portion are based on the user-selected parameters. If the analysis technique has only a single fixed format required for its analysis instructions then the plug-in may provide those directly without needing to look them up from a template. If a template 214 is to be invoked, the given parameter definition set 208 specifies a specific template 214. Further, if a template 214 is specified, the given parameter definition set 208 assigns a marker name to each of the various parameter values used to populate the specified template 214. The markers can be used subsequently by the appropriate plug-in 114 to populate a template 214.

Thus, the plug-ins 114 take as input the data to be analyzed (e.g., the query results) and the parameter values, which may include a template specification. Again, the particular plug-in 114 taking the input is contingent upon the user's analysis routine selection made from the user interface screen 202. The plug-in 114 then generates input 218 to the appropriate analysis applications 106. Generally, this input may be executable code or non-executable information, depending upon the particular application 106 to be invoked. The analysis routine is then run and the results from the application 106 are then displayed to the user via an output screen 220.

Particular aspects of the invention will now be illustrated with respect to exemplary user interface screens and corresponding metadata, as well as other elements of FIG. 2. Illustrative metadata corresponding to the analysis routine metadata 204 and parameter metadata 210 (i.e., the abstract analysis model 110) is shown in Table I below. In FIG. 2, the analysis routine metadata 204 is shown separate from the parameter metadata 210 merely for the sake of convenience. The file represented in Table I illustrates that, in at least one embodiment, the parameter metadata and the analysis routine metadata may be part of a single file. By way of illustration only, and not by limitation, the file represented in Table I is an XML file. For convenience, only selected portions of the XML file are shown. The removed portions are largely similar in form to those portions shown.

TABLE I

```
001    <?xml version="1.0" encoding="UTF-8"?>
002    <DQAPlug-in xmlns:xsi="http://www.w3.org/2001/XMLSchema-instance"
003    xsi:noNamespaceSchemaLocation="DQAPlugin.xsd">
004      <Extension className="com.ibm.dqa.plugin.analysis.SASAnalysisPlugin" name="SAS Print"
005
006    point="com.ibm.dqa.plugin.analysis">
007         <Parms>
008             <Field name="Template" hidden="Yes">
009                 <Type baseType="char"></Type>
010                 <Value val="C:ffiCaptureßASPrint.txt" />
011             </Field>
012             <Field name="AIXTemplate" hidden="Yes">
013                 <Type baseType="char"></Type>
014                 <Value val="/usr/local/iQEngine/SAS/Templates/SASPrint.txt" />
015             </Field>
016             <Field name="WebService" hidden="Yes">
017                 <Type baseType="char"></Type>
018                 <Value val="false" />
019             </Field>
020             <Field name="URL" hidden="Yes">
021                 <Type baseType="char"></Type>
022                 <Value val="http://puppy:9080/DQA/servlet/rpcrouter" />
023             </Field>
024             <Field name="F1" prompt="First Sort Field">
025                 <Type baseType="field"></Type>
026                 <Description>Select a field that is the primary sort field</Description>
027             </Field>
028             <Field name="F2" prompt="Second Sort Field" required="No">
029                 <Type baseType="field"></Type>
030                 <Description>Select a field that is the secondary sort field</Description>
031             </Field>
032             <Field name="F3" prompt="Title" required="No">
033                 <Type baseType="char"></Type>
034                 <Value val="" />
035             </Field>
036             <Field name="F4" prompt="List of Fields To Print" maxCount="unbounded">
037                 <Type baseType="field"></Type>
038                 <Description>Select the fields to print on the report</Description>
039             </Field>
040             <!--
041             <Field name="ClassFields" prompt="Class fields for GML Manova routine"
042
043    maxCount="unbounded">
044                 <Type baseType="field"></Type>
045                 <Description>Select list of fields to produce class statistics for</Description>
046                 <Value val="Hemaglobin"/>
047                 <Value val="Hematocrit"/>
048             </Field>
049             <Field name="DependentVariable" prompt="Dependent variable">
```

TABLE I-continued

```
050                <Type baseType="field"></Type>
051                <Description>Dependent variable used for analysis</Description>
052            </Field>
053            <Field name="IndependentVariable" prompt="Independent variable used for analysis">
054                <Type baseType="field"></Type>
055                <Description>Independent variable used for analysis</Description>
056            </Field>
057            <Field name="DistributionType" prompt="Distribution type">
058                <Type baseType="char">
059                    <List>
060                        <Value val="nouni" />
061                        <Value val="chi" />
062                        <Value val="normal" />
063                    </List>
064                </Type>
065                <Description>Select type of distribution to use</Description>
066            </Field>
067            -->
068        </Parms>
069        <PluginDesc>Simple SAS program to sort and print data.</PluginDesc>
070      </Extension>
071      <Extension className="com.ibm.dqa.plugin.analysis.SASAnalysisPluginByColumn" name="SAS Print
072    by Column"
...
073      </Extension>
074      <Extension className="com.ibm.dqa.plugin.analysis.SASAnalysisPlugin" name="SAS Univariate"
...
075      </Extension>
076   <Extension className="com.ibm.dqa.plugin.analysis.SASAnalysisPlugin" name="SAS Tabulate"
077
078      point="com.ibm.dqa.plugin.analysis">
079        <Parms>
080            <Field name="Template" hidden="Yes">
081                <Type baseType="char"></Type>
082                <Value val="C:ffiCapture™abulate.txt" />
083            </Field>
084            <Field name="AIXTemplate" hidden="Yes">
085                <Type baseType="char"></Type>
086                <Value val="/usr/local/iQEngine/SAS/Templates/Tabulate.txt" />
087            </Field>
088            <Field name="WebService" hidden="Yes">
089                <Type baseType="char"></Type>
090                <Value val="false" />
091            </Field>
092            <Field name="F1" prompt="Class variable">
093                <Type baseType="field"></Type>
094                <Description>Select a field that is used for the class variable</Description>
095            </Field>
096            <Field name="F2" prompt="List of varaibles" maxCount="unbounded">
097                <Type baseType="field"></Type>
098                <Description>Select fields for the variable list</Description>
099            </Field>
100            <Field name="F3" prompt="Title" required="No">
101                <Type baseType="char"></Type>
102                <Value val="" />
103            </Field>
104        </Parms>
105   </Extension>
...
```

Figure 3:
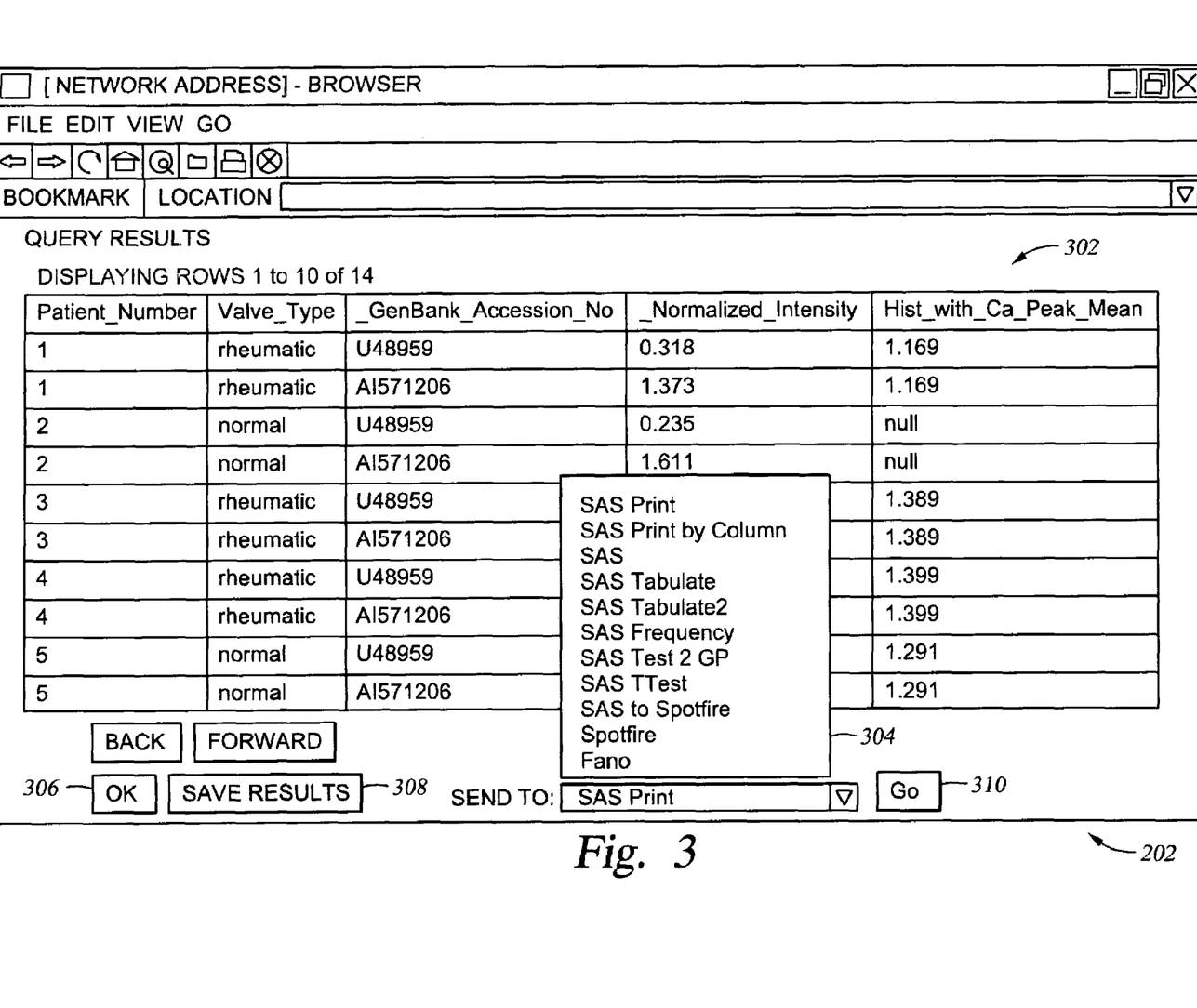
FIG. 3 is a representative user interface screen showing query results and configured with an analysis routine selection menu.

As noted above, following display of query execution results in the screen 202, the user may elect to perform analysis. An illustrative screen 202 of the user interface 108 from which analysis may be initiated is shown in FIG. 3. The screen 202 generally includes query results 302 and an analysis routine selection menu 304. The analysis routine selection menu 304 displays each of the available analysis routines populated by the analysis routine selections 206 of the analysis routine metadata 204. illustratively, the analysis routine "SAS Tabulate" is highlighted for selection. Referring to Table I, the corresponding portion in the metadata file which specifies the "SAS Tabulate" analysis routine is provided in line 076 with the name="attribute". Note that the location of the appropriate plug-in 114 for the "SAS Tabulate" analysis routine is specified at line 076 with the className="attribute". Each of the other available analysis routines are also defined in the metadata file of Table I, but may not be shown as the metadata file has been redacted for convenience.

The screen 202 is further configured with a variety of buttons which a user may click to invoke a desired function. For example, clicking on an "OK" button causes the query results screen to be dismissed and the user returned to the query selection screen. Clicking on a "Save Results" button 308 allows the user to save the query results. The results may be analyzed according to the selected analysis routine (in the present example "SAS Tabulate") by clicking "Go" button 310.

As noted above, each analysis routine selection 206 has a fixed and predefined association with a parameter definition set 208. Thus, for the SAS Tabulate analysis routine, the parameters definition set 208 is provided at lines 079-104 of Table I. In particular, the parameters include template parameters at lines 080-087, a control parameter specifying where the routine is run at lines 088-091, a series of user-selectable parameters populated with values from the query results at lines 092-096, and a parameter to render a text box that the user can fill in at line 100. Note that a separate template parameter for a particular template may be given for each operating system having different file system references. In the present illustration, a pair of template parameters is provided: one for Windows at lines 080-083 and one for AIX at lines 084-087. It is contemplated that the specified plug-in for the parameters definition set can execute the analysis application on the same server, or make a Web Services call to another server. Accordingly, a control parameter is provided at lines 088-091 to specify where the application is executed. In the present example, the parameters metadata for the SAS Tabulate analysis routine specifies three user selectable parameters: a "class variable", a "list of variables" and a "title". Note that these three user selectable parameters are given field names F1, F2, and F3, respectively. The field names correspond to markers in the template specified by the template parameter. The template and the markers will be described in more detail below.

Figure 4:
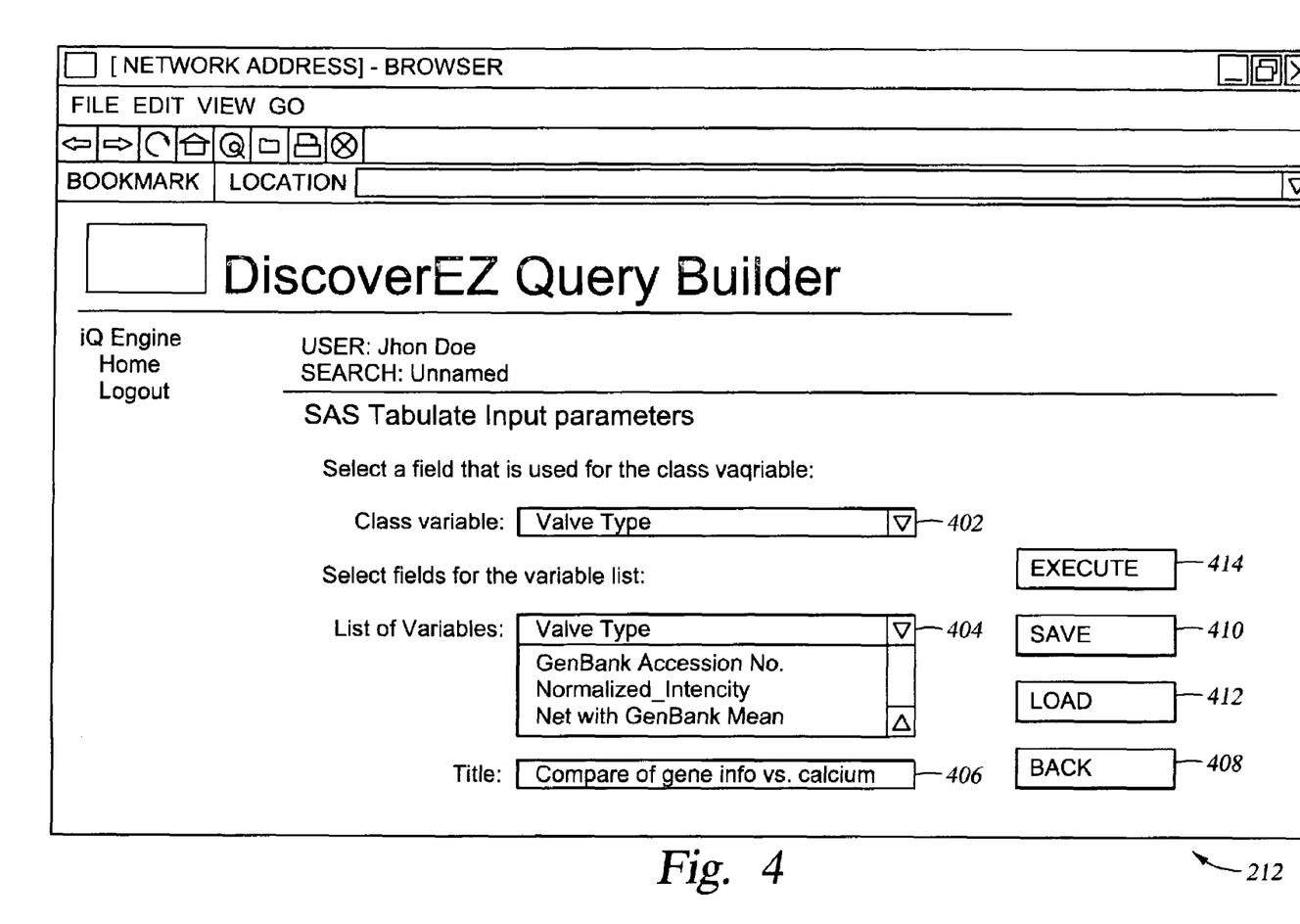
FIG. 4 is a representative input parameter selection screen.

Therefore, having selected an analysis routine selection 206 from the screen 202, the user is presented with the parameter selection screen 212 populated according to the corresponding parameter definitions set 208. An illustrative parameter selection screen 212 is shown in FIG. 4. The screen 212 displays a "class variable" menu 402, a "list of variables" menu 404 and a "title" field 406. Note that each of the menus is populated with parameter values made available from the query results. The "class variable" menu 402 and the "list of variables" menu 404 each contain the complete list of fields returned in the query results, since in the case of these menus baseType="field". Other baseTypes are contemplated that will populate the screen 212 with a fixed set of values (provided in the metadata, not from the results) as well as allowing the user to enter a value. The parameter selection screen 212 also includes a plurality of buttons allowing the user to perform various functions. For example, a "Back" button 408 returns the user to the previous screen. A "Save" button 410 allows a user to save the selected parameter values, while a "Load" button 412 allows the user to load a previously saved set of parameter values. Once the user is satisfied with the parameter values selections, the analysis is run by clicking the "Execute" button 414.

In particular, clicking the "Execute" button 414 causes the query results and the parameter values to be input to the appropriate plug-in 114. The plug-in 114 is responsible for formatting the input and generating additional information needed to run the selected analysis routine. For example, additional information generated by the plug-ins 114 includes information needed to read the data to be analyzed into a particular analysis application 106.

As noted above, the plug-ins 114 may substitute the user-selected parameter values into a template 214. However, it is also contemplated that, in some cases, the plug-ins 114 are sufficiently coded to generate all the information needed to run the selected analysis routine without the use of templates 214. Again, whether or not a template 214 is invoked depends upon the analysis routine to be run.

If the parameter definitions set 208 specifies a template 214, then the plug-in 114 operates to merge the user-selected parameter values with the specified template 214 from the templates database 112. Therefore, since a particular parameter definitions set 208 (and a plug-in 114) is user selected according to the selected analysis routine (in this case "SAS Tabulate"), it follows that the template 214 is implicitly selected by the user's explicit selection of an analysis routine from the screen 202. In the present illustration, the parameters metadata for the SAS Tabulate analysis routine specifies a template having the name "Tabulate.txt", as can be seen at lines 080-083 for the Windows operating system, and at lines 084-087 for the AIX operating system. An illustration of this template is shown in Table II.

TABLE II

EXAMPLE OF TEMPLATE

| 001 | proc tabulate; |
| 002 | |
| 003 | class %F1%; *fill in with a single variable; |
| 004 | |
| 005 | var %F2%; * fill in with a variable list; |
| 006 | |
| 007 | table (%F2%)*(n*f=10.0 mean std median min max), |
| 008 | %F1% all / box='Variable' condense; |
| 009 | |
| 010 | title '%F3%'; |
| 011 | |
| 012 | run; |

In the present example, the template of Table II conforms to the SAS programming language, since the user-selected analysis routine is a SAS routine. At line 001 "proc tabulate" refers to a well-known SAS procedure to build a table. Lines 003, 005, 007, 008 and 010 correspond to those portions where parameter values are substituted, as specified according to a marker corresponding to the field name of the parameter. Recall that the field names of the parameters are specified in the parameter metadata. In the present example, the field names/markers are F1, F2, and F3. In one embodiment, the markers may be of the following type:

Marker Types

Field—Any of the fields returned from the query (or other data to be analyzed).

List of Fields—A list of one or more fields returned from the query.

Test string—A simple text entry capability where the user enters free form text.

List of pre-defined text values—The user selects from a list of pre-defined choices.

Integer—The user enters an integer number.

Float—The user enters a decimal or floating point number.

As can be seen by the user selections in FIGS. 3 and 4, F1 (an example of a field type marker) corresponds to "valve_type" (having the values normal or rheumatic), F2 (an example of a list of fields type marker) corresponds to the variable lists "_Normalized_Intensity" and "Hist_with_Ca_Peak_Mean" and F3 (an example of a text string type marker) corresponds to the title "Compare of gene info vs. calcium levels". Note that the functions to be performed (specified at line 007) are determining the mean, standard deviation, minimum and maximum. A populated template is shown in Table III.

TABLE III

EXAMPLE OF POPULATED TEMPLATE

```
001   proc tabulate;
002
003   class Valve_Type; *fill in with a single variable;
004
005   var _Normalized_Intensity Hist_with_Ca_Peak_Mean; * fill
      in with a variable list;
006
007   table (_Normalized_Intensity Hist_with_Ca_Peak_
      Mean)*(n*f=10.0 mean std median min max),
008     Valve_Type all / box='Variable' condense;
009
010   title 'Valve_Type';
011
012   run;
```

The plug-in 114 then supplements the template 214 with additional information needed to run the analysis routine. An exemplary program generated by the plug-in 114 for SAS is shown in Table IV.

TABLE IV

EXAMPLE OF INPUT GENERATED BY A PLUG-IN

```
001   ODS HTML(SWS_20030106_105007_368) body=
      "SWS_20030106_105007_368.htm";
002   DATA ResultSet;
003   INFILE cards MISSOVER DELIMITER='0C'x DSD;
004   LENGTH Patient_Number $ 10 Valve_Type $ 10 _GenBank_
      Accession_No $ 10;
005   INPUT Patient_Number Valve_Type _GenBank_Accession_No
006   _Normalized_Intensity Hist_with_Ca_Peak_Mean;
007   cards;
008   1 rheumatic U48959 0.318 1.169
009   1 rheumatic AI571206 1.373 1.169
010   2 normal U48959 0.235 .
011   2normal AI571206 1.611 .
012   3 rheumatic U48959 4.196 1.389
013   3 rheumatic AI571206 0.929 1.389
014   4 rheumatic U48959 7.451 1.399
015   4 rheumatic AI571206 0.474 1.399
016   5 normal U48959 7.237 1.291
017   5 normal AI571206 0.434 1.291
018   6 normal U48959 1.097 1.464
019   6 normal AI571206 0.892 1.464
020   7 normal U48959 0.903 1.278
021   7 normal AI571206 2.064 1.278
022   ;
023   proc tabulate;
024
025   class Valve_Type; *fill in with a single variable;
026
027   var _Normalized_Intensity Hist_with_Ca_Peak_Mean; * fill
      in with a 027 028 variable list;
029
030   table (_Normalized_Intensity Hist_with_Ca_Peak_
      Mean)*(n*f=10.0 mean std 031 median min max),
032   Valve_Type all / box='Variable' condense;
033
034   title 'Compare of gene info vs calcium levels';
035
036   run;
037   ODS HTML(SWS_20030106_105007_368) close;
```

Line 001 specifies a destination for the output generated by the plug-in. Lines 002-022 make up the dynamically generated information needed to read the data into SAS. The DATA statement (line 002) and the INFILE statement (line 003) are standard to SAS. The LENGTH statement (line 004) specifies the length of the fields. Note that only the length for character fields needs to be specified. The INPUT statement (line 005) specifies the list of fields returned from the query. The data values of the query results are provide at lines 008-021. Lines 023-036 are the populated template shown in Table III.

The exemplary program of Table IV is representative of the input 218 shown in FIG. 2. Thus, as can be seen from Table IV, the data to be analyzed may be any set of input data that has at least enough information to describe which fields it contains, the types of fields, and the actual values.

Figure 5:
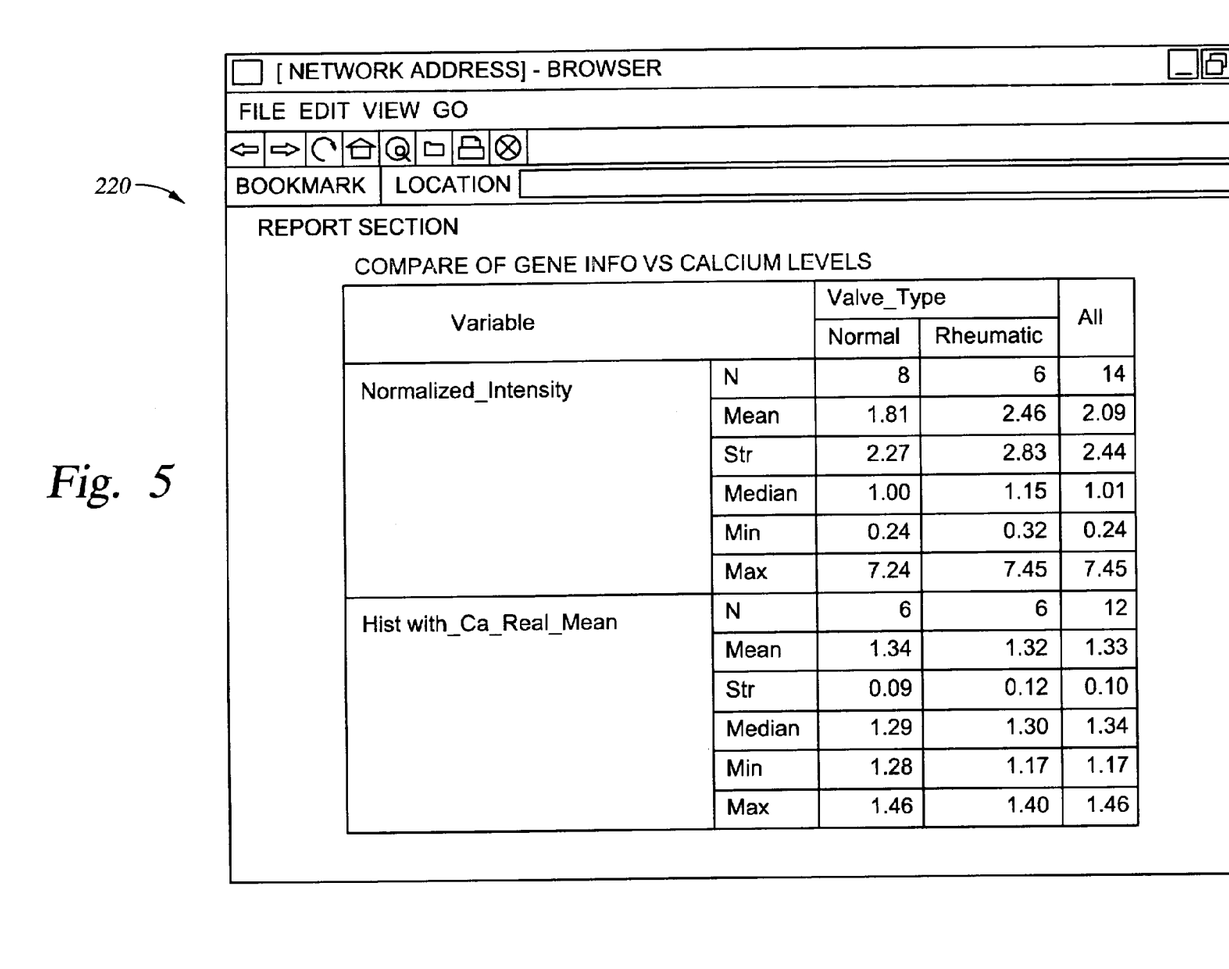
FIG. 5 is a representative output screen showing the results of a selected analysis.

For the present example, the results of running the SAS Tabulate routine with the input of Table IV are shown in the output screen 220 illustrate in FIG. 5.

While the foregoing is directed to embodiments of the present invention, other and further embodiments of the invention may be devised without departing from the basic scope thereof, and the scope thereof is determined by the claims that follow.

What is claimed is:

1. A method of dynamically generating input for an analysis environment to perform data analysis, comprising:
receiving a user selection of an analysis routine configured to perform an analysis on selected data in the analysis environment, wherein the user-selected analysis routine has a predefined association with a code portion configured to provide the input to the analysis environment;
in response to the user selection of the analysis routine, displaying parameter values in one or more fields; wherein the one or more fields are predefined for the user selected analysis routine and wherein the parameter values are made available from the selected data;
receiving a user selection of one or more of the parameter values;
dynamically generating, by the code portion, and based on the user selections, information necessary to perform the analysis on the selected data; wherein generating information comprises populating a template with the user-selected parameter values, wherein the template comprises markers corresponding to the user-selected parameter values; and
outputting, by the code portion, the input to the analysis environment; wherein the input includes at least the selected data and the information necessary to perform the analysis on the selected data by the analysis routine.

2. The method of claim 1, wherein the selected data comprises query results.

3. The method of claim 1, wherein generating information necessary to perform the analysis on the selected data comprises generating information needed to read the selected data into the analysis environment.

4. The method of claim 1, wherein the analysis environment is configured for medical analysis.

5. The method of claim 1, wherein the analysis is an analysis of medical information.

6. The method of claim 1, wherein the code portion is one of a plurality of available code portions, each configured for one or more analyses routines.

7. The method of claim 1, wherein the user selections are made from user interfaces populated from an abstract analysis model.

8. The method of claim 7, wherein the user interfaces are graphical user interfaces.

* * * * *